United States Patent [19]

Malone

[11] 4,039,548

[45] Aug. 2, 1977

[54] SYNTHETIC EPOXIDE ENAMEL LIKE COATING COMPOUND

[76] Inventor: Laurence A. Malone, 2111 Jefferson Davis Highway, Arlington, Va. 22202

[21] Appl. No.: 679,729

[22] Filed: Apr. 23, 1976

[51] Int. Cl.² .................... C08J 3/06; C08K 5/15; C08L 63/02
[52] U.S. Cl. .................. 260/29.2 EP; 260/37 EP; 260/47 EC; 260/830 TW; 428/63; 428/415
[58] Field of Search .............. 260/37 EP, 29.2 EP

[56] References Cited

U.S. PATENT DOCUMENTS

| | | | |
|---|---|---|---|
| 3,025,263 | 3/1962 | Lee | 260/37 EP |
| 3,288,616 | 11/1966 | De Vries | 260/37 EP |
| 3,304,344 | 2/1967 | Szawlowski | 260/37 EP |
| 3,519,602 | 7/1970 | Castro et al. | 260/37 EP |
| 3,562,198 | 2/1971 | Slocombe | 260/37 EP |

*Primary Examiner*—Murray Tillman
*Assistant Examiner*—Arthur H. Koeckert
*Attorney, Agent, or Firm*—Larson, Taylor and Hinds

[57] ABSTRACT

Disclosed herein is a composition comprising a mixture of three components, the first two thermoset resin components comprising together from 30 to 70 percent by volume and a third component which may be added from 10 to 30% by volume, which mixture hardens into a synthetic epoxide enamel-like coating compound, particularly useful although not limited in use to the art of coating, mending and restoring ceramics. No firing or heating is required. The composition when properly combined and applied has suitable pot life to permit application by brush or by hand. Further, the composition can be mixed with oil base paints or pigments limited with oil base colors and applied as a finish or enameling coat to stoneware, pottery or porcelain ceramics. The composition is adhesive, airdrying and self-curing.

5 Claims, No Drawings

SYNTHETIC EPOXIDE ENAMEL LIKE COATING COMPOUND

FIELD OF THE INVENTION

This invention relates to a synthetic epoxide composition that looks like enamel, air dries, and hardens to the consistency of glass. In particular, this invention relates to an enamel coating composition which is curable at temperatures from 30° to 90° Farenheit.

BACKGROUND OF THE INVENTION

Fine porcelain or chinaware as it is known in the trade is made with kaolin. When combined with oxygen, silicon makes silica which is common to clay. Another essential part of clay is alumina. When silica and alumina are combined with kaolin which is a very fine white clay, "ball" clay is formed from which porcelain can be and is produced. Ball clay fires white and has a fine white enamel-like surface, with the texture quality and hardness of glass. The enamel-like substance disclosed herein is intended for use as a restorative coating for damaged articles having a porcelain enamel-like surface. Such a coating is intended to cover over and invisibilise mended breaks, cracks and depressions, chips or pock marks in the surface of such porcelain or ceramic articles. There will undoubtedly be other uses such as to line subways, coat storage granaries and the like. Hence, the material described as this invention is not to be construed as limited solely to the craft of china mending. Although the composition invented herein is excellent for restoring and finishing articles that should not be refired in a kiln or otherwise heat treated.

A great need exists for a mending and restoring material externally identical or interchangeable with porcelain and similar ceramics such as faience, majolica, soft paste ware, which requires no kiln or firing and which is hardenable thermogenetically, air-drying, and self-curing, and which may be applied with a brush or by hand. Such material is essentially useful for china repair and coating finishes enamel-like in nature, and as a coating material to fashion identical finishes over broken areas of an existing china or porcelain ceramic article. The material hardens without being subjected to high temperatures and may be used with considerable convenience and efficiency to repair or modify ceramics or porcelains decorated by paint otherwise by materials which would normally be destroyed by subjection to high temperatures or re-firing. The material desirably exhibits a small coefficient of expansion, matching that of porcelain. The material composition desirably withstands high temperatures to which a chinalike object may be subjected in use, such as when being cleaned in a dishwasher. Once cured, the material is impervious to hot or cold water, acids, stains, saline solutions and the like.

It is an object of the present invention to provide a material which is capable, without firing, of hardening into a hard enamel-like coating substance.

It is an object of this invention to provide a conveniently hardenable coating compound which is sufficiently strong and exhibits the lustrous or the glazed enamel finish of porcelain, china-ware or ceramics without firing or heat treatment of any kind.

It is another object of this invention to provide a coating compound which hardens to be substantially impervious to water and to changes of temperature.

It is similarly an object of this invention to provide a composition which can be mexed with oil based paints to enable a ceramist or china-mender to simulate and restore the ceramic article he is mending, in such a manner that the chinaware or ceramic surface of the article is restored to perfection and the damage is invisibilised.

It is another object of this invention to provide a coating composition having a low coefficient of expansion similar to that of china-ware.

SUMMARY OF THE INVENTION

The foregoing and other objects which will be apparent to those having ordinary skill in the art are achieved according to the invention by providing a composition including a first component in admixture with 30 to 70 percent by volume of a second component. The first component includes epichlorohydrin; water; ethanol; butyl cellusolve; bisphenol-A and EPON 828. The second component includes epichlorohydrin; water;butyl cellusolve; bisphenol-A; EPON 834; and triethylene tetramine or ethylene diamine. The third component includes EPON 828; EPON 834; calcium carbonate; and titanium dioxide. It may be mentioned that nadic methyl anhydride is a curing agent for both Epon 828 and Epon 834 as well as such others as 1, 8-menthane or ethylene diamine; triethylene tetramine; and the like. The resins of the first two components comprise a two part system. The third component is incorporated into this backbone system to create the resulting high glaze enamel-like coating compound.

The first component includes EPON 828, which is an epoxy resin generally formed from the condensation of bisphenol-A with epichlorohydrin by methods known in the art, and marketed by Shell Chemical Company. EPON 828 is a liquid at room temperature, having a Gardner-Holt viscocity of 100–160 poise at 25° C and an epoxide equivalent of 185–192 grams of resin containing one gram-equivalent of epoxide.

The second component includes EPON 834, also commercially available from Shell Chemical Company and a condensation product of epichlorohydrin and bisphenol-A. It is a semi-solid epoxy resin at room temperature having a melting point of 35°–40° C and an epoxide equivalent of 230–280. This component also includes a suitable amine curing agent, such as EPON V-15, marketed by Shell Chemical Company, linear amines such as ethylene diamine; diethylene triamine, triethylene tetramine and the like.

The epoxy resins and EPON V-15 resin are more fully described in Shell Chemical Company Technical Publications SC:71-17, entitled "EPON Resin Esters for Surface Coatings", dated August, 1971 and SC:71-11 entitled, "Amine-Cured EPON Resin Coatings", dated March, 1973.

The first two components are combined in a ratio of from about 40 to 60 percent by weight of each component, based on the total weight of both components. The third component is mixed with the other two components in an amount of from 10 to 30 percent by volume of the total volume of all three components. The resulting white enamel coating is a heavy viscous liquid or semi-solid material which can be applied to china ware of all kinds. The following Table I illustrates the operable ranges of components of this invention.

| Material | Amount (% by weight) |
| --- | --- |
| First Component | |
| Epichlorohydrin | 18.1–32.1 |
| Water | 1.0–4.1 |
| Ethanol | 2.1–6.1 |
| Butylcellusolve | 2.1–8.1 |
| Bisphenol-A | 18.6–28.6 |
| EPON 828 | 12.9–22.0 |
| Second Component | |
| Epichlorohydrin | 18.1–32.1 |
| Water | 1.0–4.1 |
| Ethanol | 2.1–6.1 |
| Butylcellusolve | 2.1–8.1 |
| Bisphenol-A | 12.6–24.6 |
| EPON 834 | 12.9–22.0 |
| Amine Curing Agent | 1.0–4.0 |
| Third Component | |
| EPON 828 | 32.1–36.1 |
| EPON 834 | 1.0–4.0 |
| Calcium carbonate | 42.9–56.9 |
| Titantium dioxide | 1.0–3.0 |

The first component is prepared by blending the particulate ingredients in any suitable container as described elsewhere herein with simple hand stirring. The epoxies are conveniently in soluble form, and there is normally sufficient liquids and water to meet the requirements of blending. This is true of the second component as well, as described elsewhere herein.

Prior to use, a portion of the second component is blended with an equal volumetric portion of the first component and mixed in any convenient manner, with the third component in a volumetric portion of about 10 to 30% of the third component. Mix with a stiff spatula. The material is originally pasty or syrrupy, but changes to a semi-solid paste in a fairly short time, 20 to 35 minutes, longer setting time resulting when more water is present. The mixture begins to set up hard in about 45 minutes. The product sets up, without firing, to an enamel-like composition and finish. The hardened material is as hard and as strong as stone and is impervious to water and resistant to elevated temperatures, boiling and the like and to changes in temperature and is eminently suitable for simulating, repairing, modification restoration and mending of ceramic articles and like objects.

USE

Illustrative instructions are given in the following examples for repairing, resurfacing, modifying and restoring damages common to ceramics, porcelain and china; glaze damage to the edge of a china saucer or plate or similar article, lost or missing surface chips, broken out edge chips, and flake chips. The damages discussed are by no means the only kinds of damage that can be repaired, but the discussions are indicative of basic teachings.

GLAZE DAMAGE AND CHIPS REPLACED (USE OF COMPOSITION)

1. Place a small amount of the composition in a saucer.
2. Add tint or shade of pigment to match background of the ceramic to be mended.
3. Smooth the composition into the areas where it is needed. It can be handled to fill cracks, nicks, even small broken out areas. It is especially serviceable for covering over large areas that have already been prepared for repair. If the surface flake damage has bitten down slightly into the china surface below, prepare the composition using your finger; a spatula or an art brush.
4. Permit the material to get semi-hard, which it will do in about 20 minutes.
5. Dampen fingers in methylal, methyl ethyl ketone or any laquer thinner before material has set and smooth away excess, which reduces need for sanding and eliminates the scratching of surrounding areas of glaze.
6. Permit the material to harden. Finish will be an enamel-like glaze. This material will adapt itself to oxide paint decorating (china painting). A final gloss need not be added.

TO RESTORE A SURFACE CHIP

1. Prepare a mix of the composition and make a fairly firm paste of it by using about equal parts by volume.
2. Lay in the paste using an art brush or by hand.
3. Dampen fingers in methylal or water and smooth away excess after 20 minutes or so, as the material will then be semi-hard.
4. If the damaged area is deep, apply two or three thick layers, one layer at a time.
5. Balance the article in a sand box, if necessary, and allow to dry between applications. The final application should be smoothed and the excess smoothed away by dampening the fingers in water or methylal.
6. Match and mix the final shade of paint color with the composition to match the article being mended. When dry, reglaze the item, unless a bisque finish is desired. When dry, the article will be ready for final decoration if it is a pattern piece.

RESTORATION

Where the surface of an article of china-ware has eroded or become badly stained by calcareous material, this composition is especially needed and useful in restoration of the surface, as a coating.

1. Make a very firm paste mix by allowing the mix to stand a few minutes.
2. Assuming the full receive the composition, apply the composition-paste in a thick layer all over the damaged surface by hand. Use water or methylal to smooth as you go, until you have exactly the smoothness needed to coat, and blend in with the unrestored surfaces of the article.
3. The material may be combined with any oil base oxide paint to obtain the tint desired. Mix well with a spatula in a circular motion. The resulting compound will have adhesiveness sufficient for it to hold to the surface to which it is applied. It will not run or drip. It will also cover all erosion and stains, surface flaking and the like. When the compound has hardened, decorate and glaze.

Conventional pigments, texturizing agents and the like, may also be added to either or both components in amounts needed for a desired pigmentation or texture effect. It will be clear to those having ordinary skill in the art that other materials such as pigments, filler, and the like can be incorporated into the third component to impart color, texture, and strength. The preferred finishing material, having the appearance of porcelain itself is achieved by using the third component with clear epoxy resin and hardener. The reain and hardener must be mixed first in equal parts by volume and then the third component can be added. The first part of the system should also first be tinted to match the surface of the porcelain article to which the admixture (compound) is going to be applied. The result will provide an enamel like finish and hardness equal to that of semi-precious stones. Articles of jewelry containing hard paste stones can thus be simulated and repaired. By adding the third component to equal parts of clear epoxy resin and hardener you will achieve great bonding strength as well as texture. The strengthened composition can be used to provide structural surfaces as well as bond two pieces of material together.

What is claimed is:

1. A composition capable of hardening into an enamel coating without heating and comprising a mixture of:

A. A first component which comprises:
   18.1–32.1% by weight of epichlorohydrin;
   1.0–4.1% by weight of water;
   2.1–6.1% by weight of ethanol;
   2.1–8.1% by weight of butylcellusolve;
   18.6–28.6% by weight of bisphenol-A; and
   12.9–22.0% by weight of an epoxy resin having a viscosity of 100–160 poise and an epoxide equivalent of 185–192;

B. A second component which comprises:
   18.1–32.1% by weight of epichlorohydrin;
   1.0–4.1% by weight of water;
   2.1–6.1% by weight of ethanol;
   2.1–8.1% by weight of butycellusolve;
   12.6–24.6% by weight of bisphenol-A;
   12.9–22.0% by weight of a semi-solid epoxy resin having an epoxide equivalent of 230–280; and
   1.0–4.0% by weight of an amine curing agent; and C. A third component which comprises:
   32.1–36.1% by weight of an epoxy resin having a viscosity of 100–160 poise and an epoxide equivalent of 185–192;
   1.0–4.0% by weight of a semi-solid epoxy resin having an epoxide equivalent of 230–280;
   42.9–56.9% by weight of calcium carbonate; and
   1.0–3.0% by weight of titanium dioxide.

2. The composition of claim 1 wherein the first component comprises from about 40 to about 60 weight percent of the total weight of the first and second components.

3. The composition of claim 1 wherein the third component is mixed with the other two components in an amount of from 10 to 30 percent by volume of the total volume of all three components.

4. The composition of claim 1 which is further described as capable of setting up hard without heat curing in less than about 45 minutes.

5. The composition of claim 1 wherein the amine curing agent is ethylene diamine.

* * * * *